United States Patent [19]
Sato et al.

[11] Patent Number: 4,797,741
[45] Date of Patent: Jan. 10, 1989

[54] INFORMATION SIGNAL TRANSMISSION SYSTEM

[75] Inventors: Chikara Sato; Tadayoshi Nakayama; Koji Takahashi; Tomohiko Sasatani, all of Kanagawa, Japan

[73] Assignee: Canon Kabushiki Kaisha, Tokyo, Japan

[21] Appl. No.: 898,936

[22] Filed: Aug. 21, 1986

[30] Foreign Application Priority Data

Aug. 28, 1985 [JP] Japan .................................. 60-189275
Dec. 23, 1985 [JP] Japan .................................. 60-291175

[51] Int. Cl.[4] .............................................. H04N 7/12
[52] U.S. Cl. .................................... 358/138; 382/56; 364/574
[58] Field of Search ................. 358/260, 133, 138, 36; 364/574, 724; 382/56

[56] References Cited

U.S. PATENT DOCUMENTS

| | | | |
|---|---|---|---|
| 4,183,051 | 1/1980 | Richman | 358/36 |
| 4,365,273 | 12/1982 | Yamada et al. | 382/56 |
| 4,566,128 | 1/1986 | Araki | 382/56 |
| 4,598,372 | 7/1986 | McRoberts | 382/56 |
| 4,602,333 | 7/1986 | Komori | 382/56 |
| 4,633,326 | 12/1986 | Endoh | 382/56 |
| 4,691,329 | 9/1987 | Juri et al. | 382/56 |

Primary Examiner—E. A. Goldberg
Assistant Examiner—Lincoln Donovan
Attorney, Agent, or Firm—Robin, Blecker & Daley

[57] ABSTRACT

An information signal transmission system is arranged to divide an original image information signal which consists of information signals representing a number k×l (k and l: positive integers) or picture elements into a plurality of small blocks, each grouping a number m×n (m and n: positive integers) of picture elements to have a plurality of compressing modes of different information compressing rates; and to compress the information signal for each of the blocks in one of the plurality of compressing modes in transmitting these information signals.

35 Claims, 10 Drawing Sheets

○ TRANSMITTED PICTURE ELEMENTS
× SKIPPED PICTURE ELEMENTS
⊘ INTERPOLATING PICTURE ELEMENTS

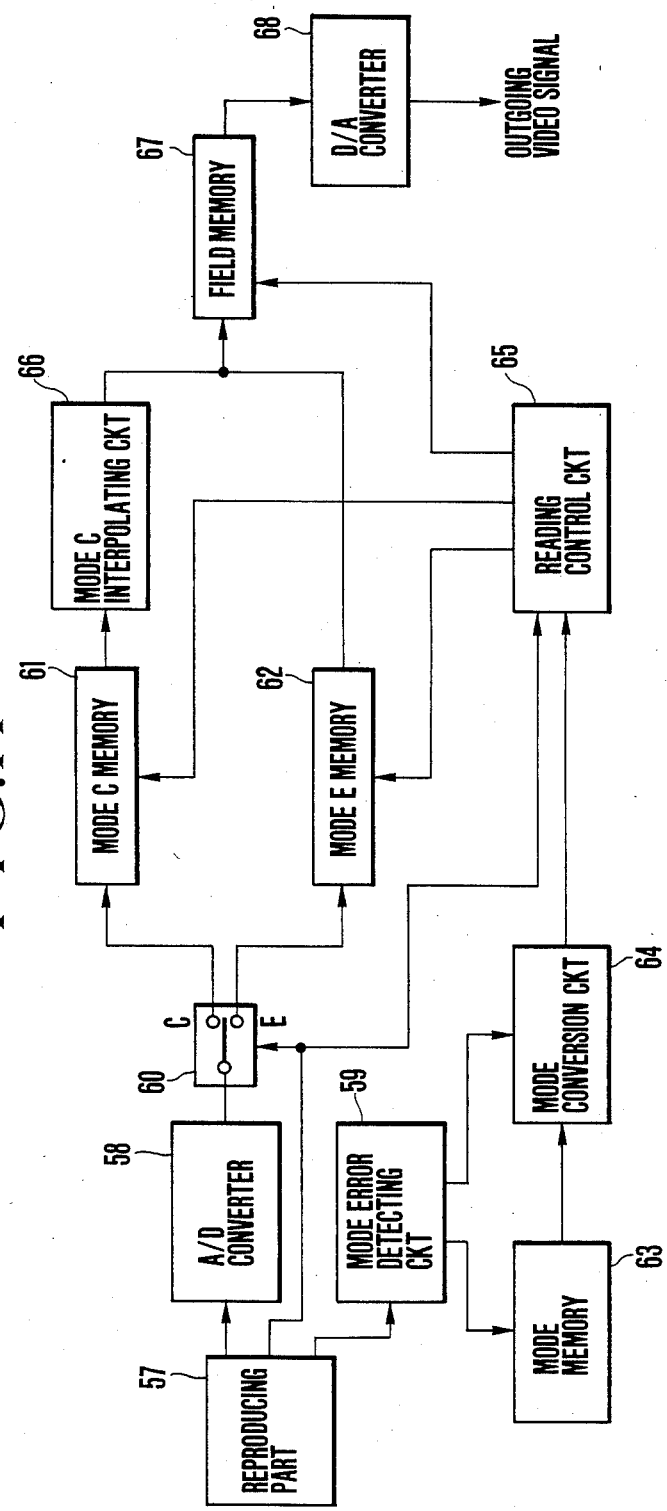
F I G. 14

INFORMATION SIGNAL TRANSMISSION SYSTEM

BACKGROUND OF THE INVENTION

1. Field of the Invention

This invention relates to an information signal transmission system of the kind arranged to transmit information signals by compressing them.

2. Description of the Related Art

The conventional information compressing transmission methods include, for example, a method called the time axis transform method (hereinafter referred to as the TAT method). In the TAT method, an information signal is compressed for transmission by utilizing the fact that, in compressing the band-width of an information signal, the density of the information signal in one part thereof differs from another.

FIG. 1 of the accompanying drawings shows the operating principle of the TAT method as applied to a case where a signal is processed in a one-dimensional manner. Referring to FIG. 1, as indicated with broken lines, an original signal is divided into groups or blocks of picture elements by a given account of information. Each of the divided groups is subjected to a discrimination between a dense state and a sparse state of information. For a group which is thus determined to be dense, all data that are obtained by sampling the original signal are transmitted as transmission data. Meanwhile, in the case of a group determined to be sparse, only a part of data obtained by sampling is transmitted while the remainder of the same group is not transmitted and regarded as skipped data. In the illustration, marks "○" represent the transmitted picture element data or data to be transmitted. Marks "X" represent data not transmitted (or skipped data). The band of the transmitted information signal is compressed as the number of data transmitted per unit time is decreased by the arrangement of transmitting the data marked "○" at intervals of a given length of time.

With the picture element data thus transmitted, the skipped picture elements which are not transmitted are proximately restored by using the transmitted data to obtain interpolating data which are as indicated with marks "⊘" in FIG. 1. The interpolating data thus obtained corresponds to the sparse parts of information and has a close resemblance to the skipped data. Therefore, the signal thus restored virtually shows no difference from the original information signal, in comparison with a case where all the data are transmitted, despite of a great degree of compression effected on the transmitting band of the information signal.

In this instance, each of the data (or picture element) groups is examined to determine whether all the picture elements within the group is to be transmitted or only a part of the picture elements included in the group is to be transmitted. This determination is made by checking the fineness or elaborateness of the original signal. Information on this determination is transmitted as a transmitting mode signal concurrently with the information signal.

Further, in the case of image information signal, the transmitting band of the image information can be compressed by changing not only the horizontal sampling intervals but also vertical sampling intervals in a two-dimensional manner.

In two-dimensionally processing a signal, like in the case of an image information signal, one image plane is divided into blocks, each having an m×n number of picture elements. Then, the image density of each block is examined. A block which is determined to be dense is processed to have all the picture elements included in the block sampled and transmitted as transmission data. A block determined to be sparse is processed to have only some of the picture elements thereof sampled and transmitted as transmission data while the rest are not transmitted and processed as skipped data.

Assuming that the processing or transmitting mode in which all the picture elements are to be sampled is called "mode E" and the mode in which only a part of picture elements are to be sampled is called "mode C", the picture elements to be transmitted and the picture elements not to be transmitted in each of these different modes E and C are as shown in FIGS. 2(a) and 2(b).

FIGS. 2(a) and 2(b) show the picture element blocks, each consisting of 4×4 picture elements. The block shown in FIG. 2(a) is to be processed in the mode E while that of FIG. 2(b) to be processed in the mode C. The image information of one image plane to be transmitted is divided into blocks, each having 4×4 picture elements, from a left upper part to a right lower part of the image plane one after another. One of the above-stated two different transmitting modes is selected for each of these blocks according to the density of image carried. Sampling is performed in the mode selected.

FIG. 3(a) shows one field of TV image plane of the NTSC system divided by the above-stated method into picture element blocks, each of which consists of 4×4 picture elements. The transmitting modes E and C which are as shown in FIG. 2(a) and 2(b) are allocated to these divided blocks as applicable. Marks "○" indicate picture elements to be transmitted and marks "X" picture elements not transmitted. With the picture elements sampled in this manner, the transmitting band of the information signal is compressed by transmitting at given intervals the data thus obtained through sampling.

The transmission of the image data sampled from within each block is arranged to be effected one after another in sequence either in the horizontal direction or in the vertical direction. FIG. 3(b) shows a case where these data are transmitted one after another in the horizontal order. FIG. 3(c) shows a case where the transmission is effected in the vertical order. The reference symbols and numerals in FIGS. 3(b) and 3(c) correspond to those used for the picture elements shown in FIG. 3(a). These data are transmitted in the direction of arrows.

The picture elements which are not transmitted are proximately restored during reproduction by using the adjacent picture elements which are transmitted. Therefore, despite of the great extent of compression effected on the transmitting band of the information signal, there takes place not much changes in the amount of information as compared with a case where all the data are arranged to be transmitted.

However, there arises some difference in information level among the picture element because of positional relation, on the image plane, between the picture elements before and after transmission change-over from one block to another. For example, picture elements a and 16 which are neighboring each other across a border line between two blocks as shown in FIGS. 3(b) and 3(c) are separated as shown in FIG. 3(a) by one picture element in the horizontal direction and by four picture elements in the vertical direction. Therefore, their correlativity becomes weak, particularly in the vertical direction. This results in information level difference between one picture element and another. In other words, the probability of having a high frequency component at a boundary between one block and another becomes high. In the case of the two-dimensional TAT system in particular, there are a large number of blocks. Therefore, the probability of having a high frequency component at the boundary between adjacent blocks further increases. An image signal converted by the the two-dimensional TAT method, therefore, tends to have as a whole many high frequency components included therein.

In transmitting such an image signal, the high frequency component thereof greatly deteriorates if the transmissible band of the transmission line is narrow.

This tends to result in transmission errors and generation of noises. That trouble may be avoidable by widening the transmissible band of the transmission line. Then, however, it increases the cost of the transmission system.

Further, in the conventional information compressing transmission system, only a part of picture elements within some block to be processed in the mode C are sampled and transmitted as information data. In decoding the whole picture element information data of the block thus transmitted, an interpolating process is performed by using transmitted picture element information data for the non-transmitted picture elements. It has been inevitable, therefore, to have a certain degree of deterioration of the information. In the case of a fine image information signal in particular, it has been necessary to carry out a complex process of interpolation during a decoding operation for the purpose of minimizing the deterioration of information because of the above-stated poor correlativity among the picture elements sampled for transmission.

SUMMARY OF THE INVENTION

It is a general object of the present invention to provide an information signal transmission system which is capable of solving the above-stated problems.

It is a more specific object of this invention to provide an information signal transmission system wherein the generation of high frequency components is minimized and the deterioration of information signals can be prevented even in the event of a transmission line allowing only a narrow transmissible band.

Under this object, an information signal transmission system arranged according to this invention to divide an original image information signal which consists of information signals including a number $k \times l$ (k and l: positive integers) of picture elements into a plurality of small blocks, each block grouping a number $m \times n$ (m and n: positive integers) of picture elements; to have a plurality of compressing modes of different information compressing rates; and to compress the information signal for each of the blocks in one of the plurality of compressing modes in transmitting these information signals comprises: first compressed information signal forming means for forming and producing for every one of the blocks, a first compressed information signal consisting solely of information signals for specific picture elements included in the block; first memory means for storing the first compressed information signal; second compressed information signal forming means for forming and producing, at least for some of the blocks, a second compressed information signal consisting of information signals for picture elements other than the specific picture elements; second memory means for storing the second compressed information signal; compressing mode signal generating means arranged to determine one of the plurality of compressing modes to be used in compressing the information signal of each block and to produce a compressing mode signal representing the compressing mode thus selected; and transmission signal forming means arranged to read out, according to the compressing mode signal generated by the compressing mode signal generating means, the first and second compressed information signal corresponding to the sequence of picture elements horizontally aligned within the original image information signal from the first and second memory means and to form a transmission signal by using the first and second compressed information signals thus read out.

It is another object of this invention to provide an information signal transmission system which is capable of transmitting an image information signal in a manner whereby the original image information signal is restorable to an adequate degree without necessitating any process for discrimination of the above-stated compressing mode.

Under that object, an information signal transmission system arranged according to this invention to divide each field portion of an original image information signal which consists of information signals including a number $k \times l$ (k and l: positive integers) of picture elements into a plurality of small blocks, each block grouping a number $m \times n$ (m and n: positive integers) of picture elements; to have a plurality of compressing modes of different information compressing rates; and to compress the information signal of each of the blocks in one of the plurality of compressing modes in transmitting these information signals comprises: suppressing means for suppressing the high frequency component of each field portion of the original image information signal; first compressed information signal forming means for forming and producing for every one of the blocks of the original image information signal having the high frequency component thereof suppressed by the suppressing means, a first compressed information signal consisting solely of information signals for specific picture elements included in the block; first memory means for storing the first compressed information signal; second compressed information signal forming means for forming and producing, at least for some of the plurality of blocks of each field portion of the original image information signal, a second compressed information signal consisting of information signals for picture elements other than the specific picture elements; second memory means for storing the second compressed information signal; compressing mode signal generating means arranged to determine one of the plurality of compressing modes to be used in compressing the information signal of each block and to produce a compressing mode signal representing the compressing mode thus selected; reading means arranged to read out from the first memory means the first compressed information signal for every one of the plurality of blocks of each field portion of the original image information signal and to read out from the second memory means the second compressed information signal according to the compressing mode signal produced from the compressing mode signal generating means; and transmitting means for transmitting the first and second compressed information signals read out from the first and second memory means by the reading means and also for transmitting the compressing mode signal.

It is a further object of this invention to provide an information signal transmission system which is capable of transmitting an information signal in a manner whereby the original image information signal is restorable to an adequate degree even in cases where it becomes impossible to detect one of the compressing modes in which the information signal for each of the blocks is transmitted.

Under this object, an information signal transmission system arranged according to this invention to divide each field portion of an original image information signal which consists of information signals including a number k×l (k and l: positive integers) of picture elements into a plurality of small blocks, each block grouping a number m×n (m and n: positive integers) of picture elements; to have a plurality of compressing modes of different information compressing rates; and to compress an information signal representing each of the blocks in one of the plurality of compressing modes in transmitting these information signals comprises: suppressing means for suppressing the high frequency component of each field portion of the original image information signal; first compressed information signal forming means for forming and producing, for every one of the blocks of the original image information signal having the high frequency component thereof suppressed by the suppressing means, a first compressed information signal consisting solely of information signals for specific picture elements included in the block; first memory means for storing the first compressed information signal; second compressed information signal forming means for forming and producing, at least for a part of plurality of blocks of each field portion of the original image information signal, a second compressed information signal consisting of information signals for picture elements other than the specific picture elements; second memory means for storing the second compressed information signal; compressing mode signal generating means arranged to determine one of the plurality of compressing modes to be used in compressing the information signal for each block and to produce a compressing mode signal representing the compressing mode thus selected; reading means arranged to read out from the first memory means the first compressed information signal for every one of the plurality of blocks of each field portion of the original image information signal and to read out from the second memory means the second compressed information signal according to the compressing mode signal produced from the compressing mode signal generating means; transmitting means for transmitting the first and second compressed information signals read out from the first and second memory means by the reading means and also for transmitting the compressing mode signal; compressing mode signal error detecting means for detecting any error in the compressing mode signal transmitted by the transmitting means; and restoring means which, in the event of detection of any error by the compressing mode signal error detecting means, restores the original image information signal by using only the first compressed information signal out of the first and second compressed information signals transmitted in relation to the compressing mode signal detected as in error.

Further objects and features of this invention will become apparent from the following detailed description of embodiments thereof taken in connection with the accompanying drawings.

BRIEF DESCRIPTION OF THE DRAWINGS

FIG. 3(b) is an illustration showing a transmitting sequence in which data obtained by sampling image information within each of the blocks are transmitted in the case of transmitting them in the horizontal direction.

FIG. 3(c) shows a transmitting sequence for the sampled image information data in the even of transmitting them in the vertical direction.

FIG. 3(d) shows a data transmitting sequence in which these data are transmitted in accordance with the arrangement of one embodiment of this invention.

FIGS. 4(a) and 4(b) show correlations between a mode information signal supplied to a mode memory 6 shown in FIG. 5 and data contents written into a skip memory shown also in FIG. 5. FIG. 4(a) shows the correlation obtained when a mode information signal for a block corresponding to the left end of a line represents the mode E; and FIG. 4(b) the correlation obtained when the mode information signal represents the mode C.

FIG. 14 is a block diagram showing in outline the arrangement of the reproducing system of the VTR shown in FIG. 12.

DETAILED DESCRIPTION OF THE PREFERRED EMBODIMENTS

A VTR to which this invention is applied as an embodiment thereof is arranged as described below with reference to the accompanying drawings:

In this case, in dividing one field of a TV image plane of the NTSC system into a plurality of blocks, each block is arranged to consist of 4×4 picture elements.

Figure 5:
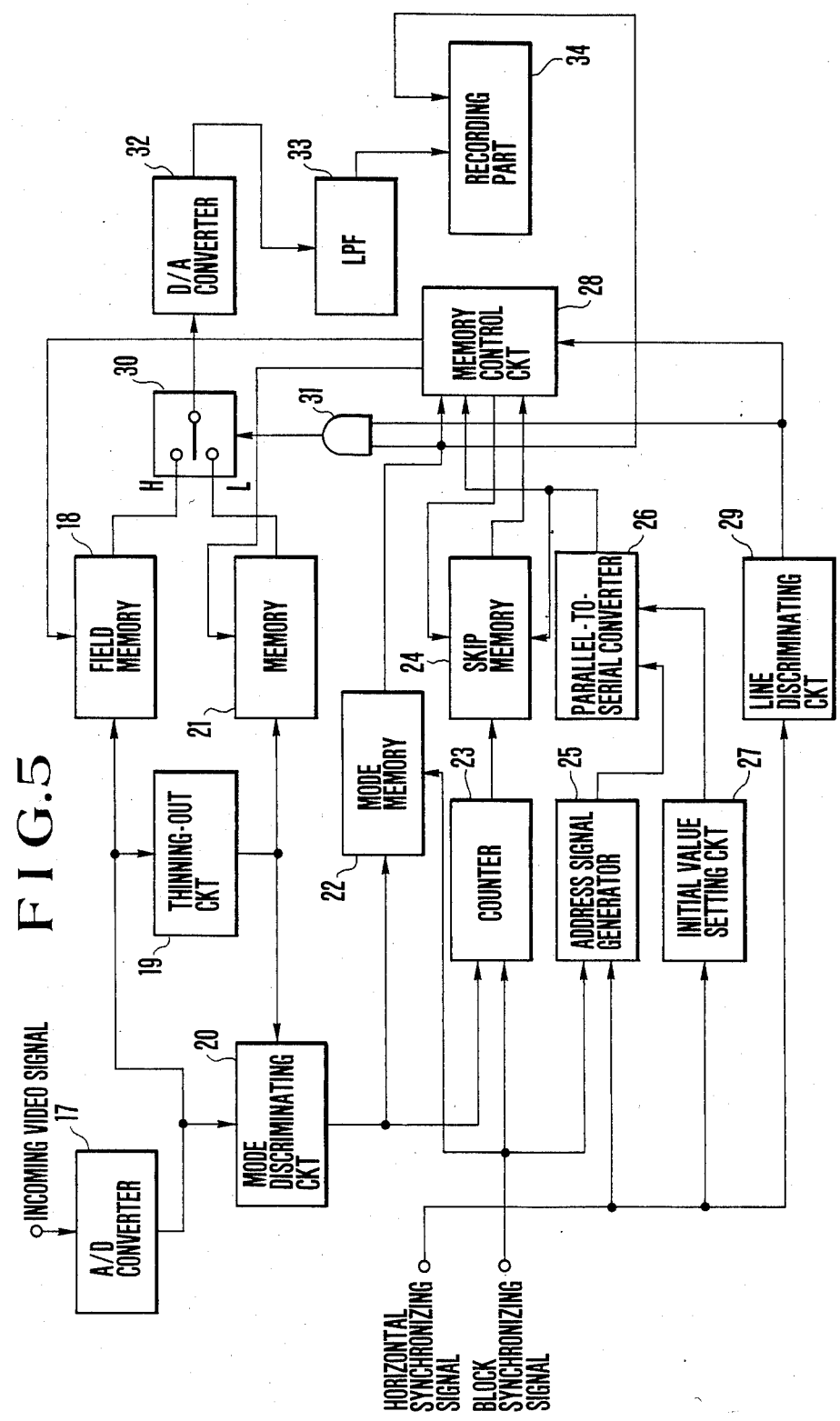
FIG. 5 is a block diagram showing in outline the arrangement of the recording system of a VTR arranged according to this invention as an embodiment thereof.

FIG. 5 shows in outline the arrangement of the recording system of the VTR embodying this invention. Referring to FIG. 5, one field portion of incoming analog video signal has all the picture element information signals thereof converted into a digital video signal by an A/D converter 17. The digital video signal thus obtained is supplied to a field memory 18, a skipping or thinning-out circuit 19 and a mode discriminating circuit 20.

Figure 1:
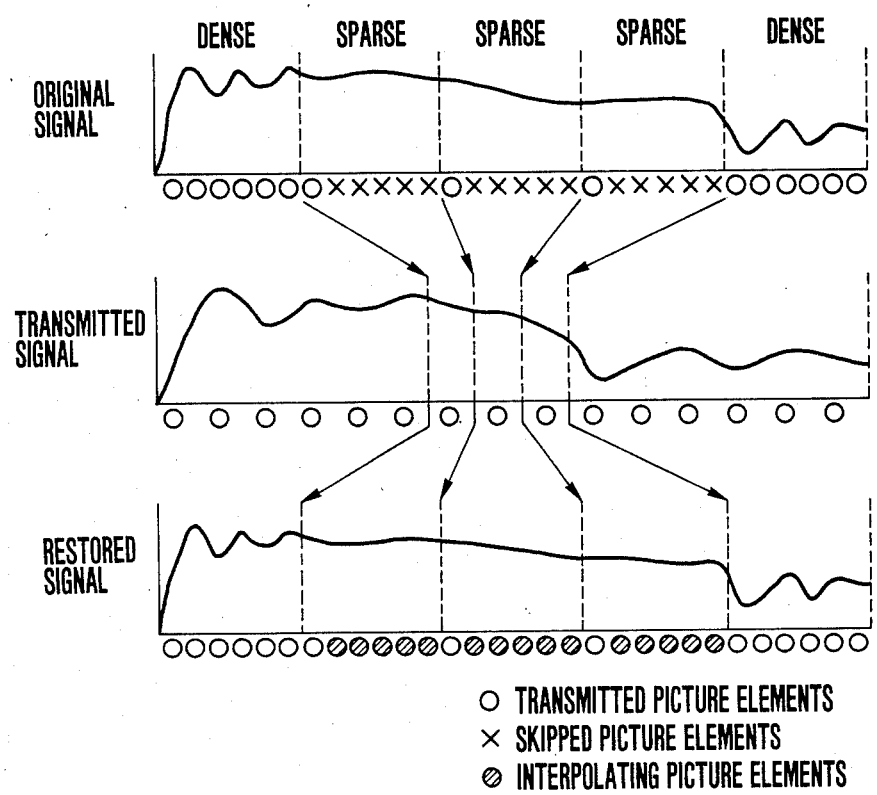
FIG. 1 is an illustration of the operating principle of the time-axis transform method showing it as applied to a case where a signal is one-dimensionally processed.
Figure 2A:
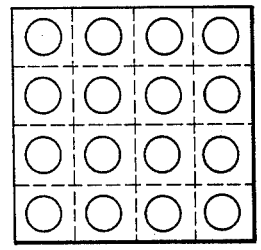
FIG. 2(a) is an illustration showing the arrangement of picture elements within a block consisting of 4×4 picture elements to be transmitted in the mode E.
Figure 2B:
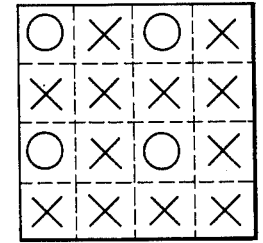
FIG. 2(b) shows the arrangement of picture elements within the block of picture elements to be transmitted in the mode C.

At the field memory 18, the digital video signal is stored in a state of carrying all picture element information for one field, i.e. in a state of a mode C digital video signal, with one address data added to each signal corresponding to one line of each block. The skipping circuit 19 is arranged to adjust the mode E digital video signal to an amount of information corresponding to the mode C. More specifically, the mode E digital video signal which is in a state as shown in FIG. 2(a) is thinned out to carry a number of picture elements into a mode C digital video signal as shown in FIG. 2(b). The mode C digital video signal which is thus obtained from the skipped or thinning-out circuit 19 is supplied to a mode discriminating circuit 20 and a memory 21. At the memory 21, the mode C digital video signal is stored with one address data added to each signal corresponding to one line of each block.

The mode discriminating circuit 20 receives both the digital video signals of the modes E and C. An interpolating process is performed on the mode C digital video signal. After the interpolation, comparison is made for every block between an image signal obtained from the mode E digital video signal and another image signal obtained from the mode C digital video signal. The mode E is allotted to the block if a difference obtained by this comparison exceeds a given threshold value. The mode C is allotted to the block if the difference is less than the threshold value. A mode information signal is generated to effect this allotment. In other words, the mode information signal is generated to represent the mode E for a block which is dense on a field image plane and the mode C for a block which is sparse on the image plane.

The mode information signals generated at the mode discriminating circuit 20 are stored at a mode memory 22 and at the same time are also supplied to a counter 23. The counter 23 is arranged to receive a block synchronizing signal in addition to the mode information signal. This block synchronizing signal is in the form of clock pulses which are synchronized with a signal length corresponding to the number of picture elements of one block in the horizontal direction. At the counter 23, with the mode information signal and the block synchronizing signal received, the pulses of the block synchronizing signal are first counted. In case that the mode E is detected from the mode information signal, a counted value obtained up to that point of time is produced and supplied to a skip memory 24. The counter 23 is then reset. In other words, a counted value which corresponds to the number of mode C blocks preceding a mode E block is stored at the skip memory 24.

An address signal generator 25 is arranged to receive the block synchronizing signal and a horizontal synchronizing signal. The horizontal synchronizing signal is a pulse signal synchronized with a line scanning process on the image plane. After detection of a pulse of the horizontal synchronizing signal, the address signal generator 25 up counts the pulses of the block synchronizing signal every time one pulse is detected. The counted value thus obtained is supplied from the generator 25 to a parallel-to-serial converter 26 as low order address data.

The horizontal synchronizing signal is supplied also to an initial value setting circuit 27. At the circuit 27, high order address data corresponding to each line is generated every time one pulse of the horizontal synchronizing signal is detected. The address data thus generated is supplied to the parallel-to-serial converter 26.

At the parallel-to-serial converter 26, the address data of high and low orders obtained in the above-stated manner are put otgether into one address data. The address data is supplied to the skip memory 24 as writing-in address data. At the skip memory 24, the counted value which is produced from the counter 23 is stored at an address designated by this writing-in address.

FIGS. 4(a) and 4(b) show the mode information signal to be supplied to the mode memory 22 and the contents of the data to be written in the skip memory 24 in relation to each other. In the case of FIG. 4(a), a mode information signal which corresponds to the left end block of one line is in the mode E. FIG. 4(b) represents another case in which the same block is in the mode C. In both of these cases, a value which is obtained by adding the number "1" of the mode E block is added to the number of mode C blocks preceding each mode E block is stored.

Next, a process for rearranging the digital video signal into the transmitting sequence as shown in FIG. 3(d) is as follows: The mode information signal which is stored at the mode memory 22 is continuously read out and supplied to a memory control circuit 28. Concurrently with this, a line discriminating circuit 29 detects whether the line being transmitted is an odd number line or an even number line by detecting the horizontal synchronizing signal. A discrimination signal which is thus produced from the circuit 29 is supplied to the memory control circuit 28. If the signal from the line discriminating circuit 29 represents an odd number line, the memory control circuit 28 continuously generates reading addresses of the field memory 18 at a speed which is ½ of the writing speed in case that the mode information signal represents the mode E. Then, the digital video signal is read out in the mode E. In the case of the mode C, the reading address is continuously generated at a speed equal to the writing speed and the digital video signal is read out in the mode C. The read out digital video signal is supplied to a switch circuit 30.

When the output of an AND gate 31 is at a high level (hereinafter referred to as H level), the connecting position of the switch circuit 30 is on one side H thereof. In this instance, the digital video signal read out from the field memory 18 is supplied to a D/A converter 32. If the output of the AND gate 31 is at a low level (hereinafter referred to as L level), the position of the switch circuit 30 is on the other side L thereof. In that instance, the digital signal read out from the memory 21 is supplied to the D/A converter 32. The AND gate 31 is arranged to receive the mode information signal from the mode memory 22 and the discrimination signal from the line discriminating circuit 29. In case that the discrimination signal indicates an odd number line (L level), the digital video signal is supplied to the D/A converter 32 from the field memory 18 when the mode information signal is in the mode E (at an H level) and is supplied from the memory 21 when the mode information signal is in the other mode C (at an L level). Further, in case that the discrimination signal indicates an even number line (at an H level), the digital video signal is supplied to the D/A converter 32 from the field memory 18 irrespective as to whether the mode information signal represents the mode E or the mode C.

Figure 3A:
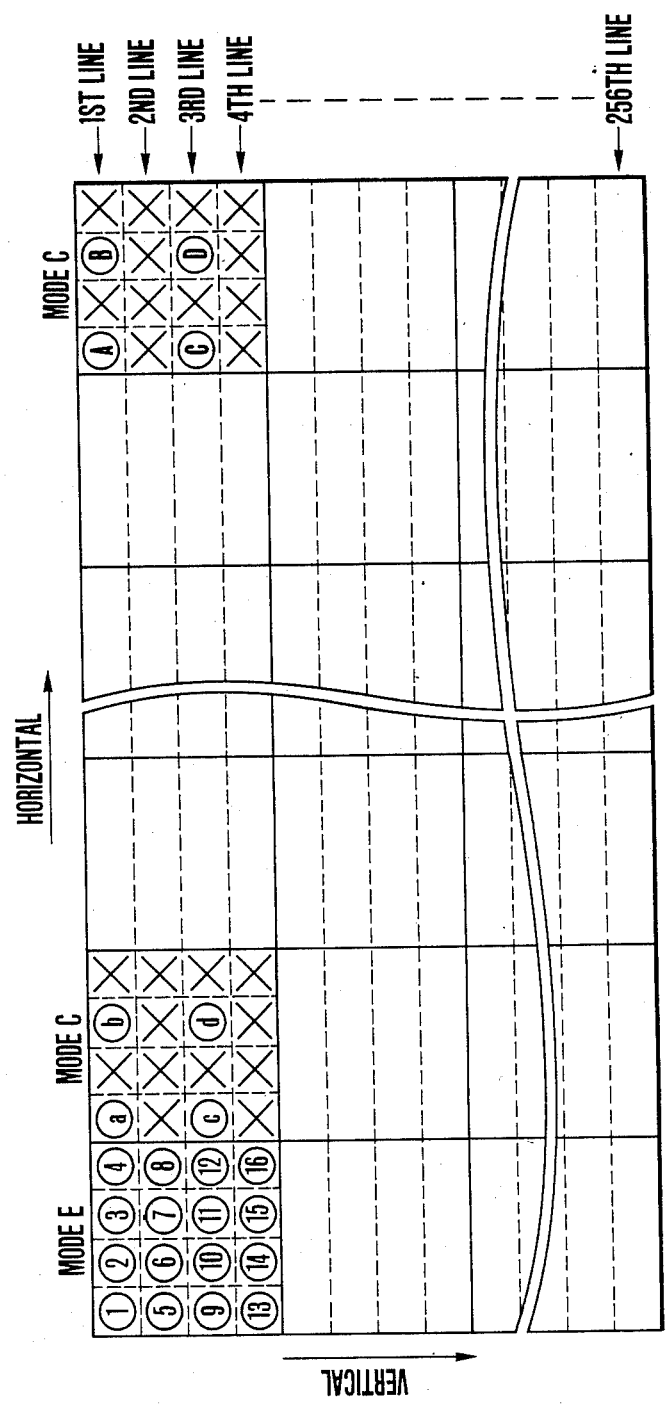
FIG. 3(a) is an illustration of one field of a TV image plane of the NTSC system as in a state of divided into blocks, each block consisting of 4×4 picture elements, and as in a state of having the sampling or transmitting modes E and C allocated to these blocks as applicable.
Figures 3B, 3C, 3D, 4A, 4B:
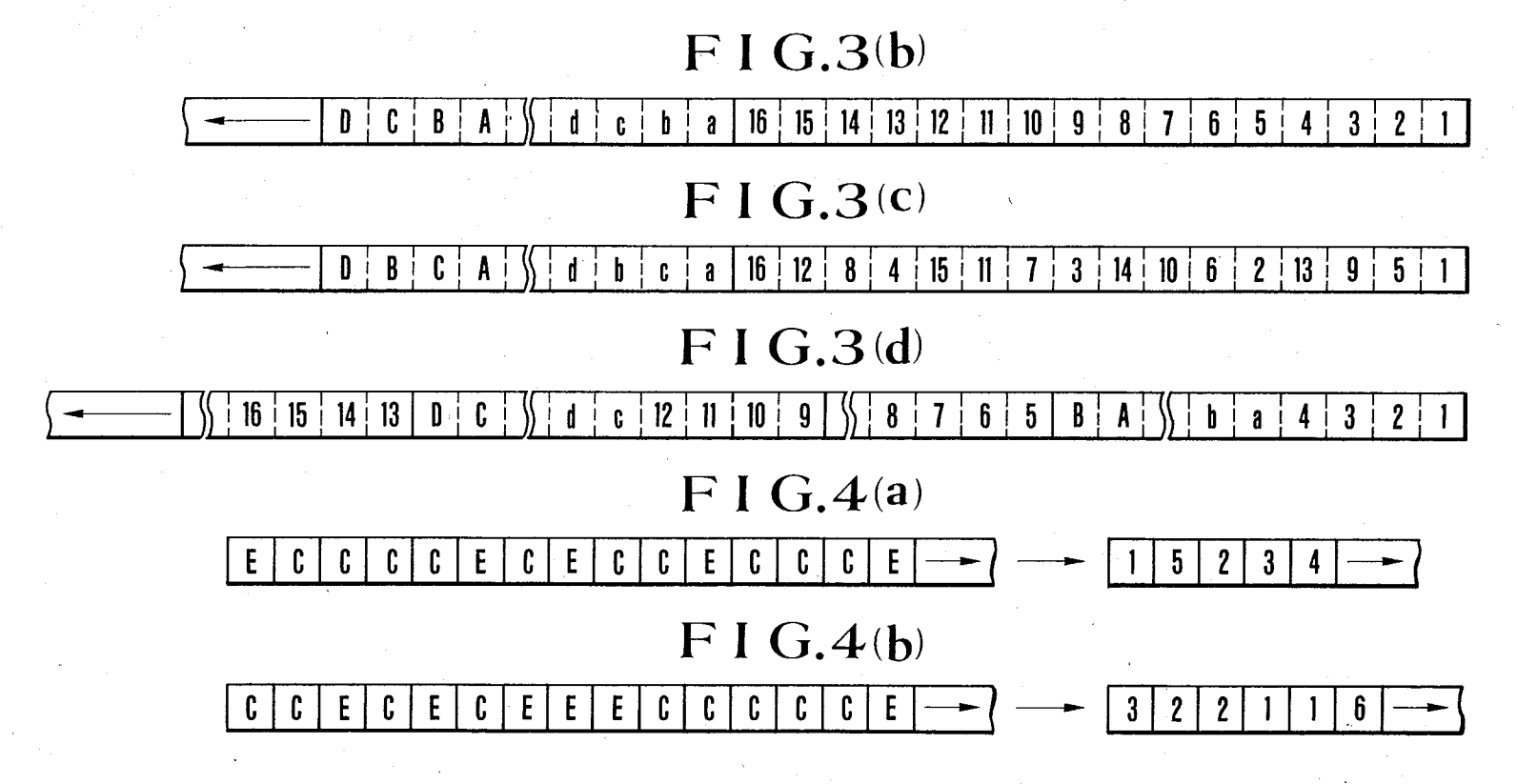

In the case of the even number line, the block of the mode C does not include any digital video signal as shown in FIG. 3(a). Therefore, in that case, the signal of the mode E block is continuously read out for the purpose of keeping a data rate unvarying. First, at the memory control circuit 28, an address within the skip memory 24 is designated for a block corresponding to the left end of the image plane and the content of the skip memory is read out. The term "content" means the above-stated stored value obtained by adding the number of the mode E block "1" to the number of mode C blocks preceding the mode E block. Therefore, the content of the skip memory 24 thus read out is added to the initial value of address of the field memory 18. Then, by using the result of this addition as a reading address, an address of the field memory 18 is designated and the digital video signal of a next mode E block is read out. After that, every time a mode E block is detected, the content of an address corresponding to the position of that block is read out from the skip memory 24. Then, the content thus read out is added to the address of the mode E block within the field memory 18. The result of this addition is used as a reading address and an address of the field memory 18 is designated. With the address thus designated, the digital video signal of the next mode E block is read out.

With the signals of the odd and even number lines processed by controlling the process of read-out from the field memory 18, the memory 21 and the skip memory 24 by means of the memory control circuit 28, a signal of constant data rate can be obtained. The digital video signal thus processed is supplied to an D/A converter 32 to be converted into an analog signal with the band thereof compressed by ½. The compressed signal is applied to a low-pass filter (hereinafter referred to as LPF) 33 for band limitation. After this, the signal is subjected to a recording process accomplished for recording on a tape at a recording part 34 together with the mode information signal produced from the mode memory 22.

The above-stated operation of this embodiment is arranged to divide the signal into blocks which have four lines of picture elements in the vertical direction. Therefore, the mode information signals for these lines are stored at the mode memory 22 and are read out from th e memory 22 every time one line is processed.

Figure 6:
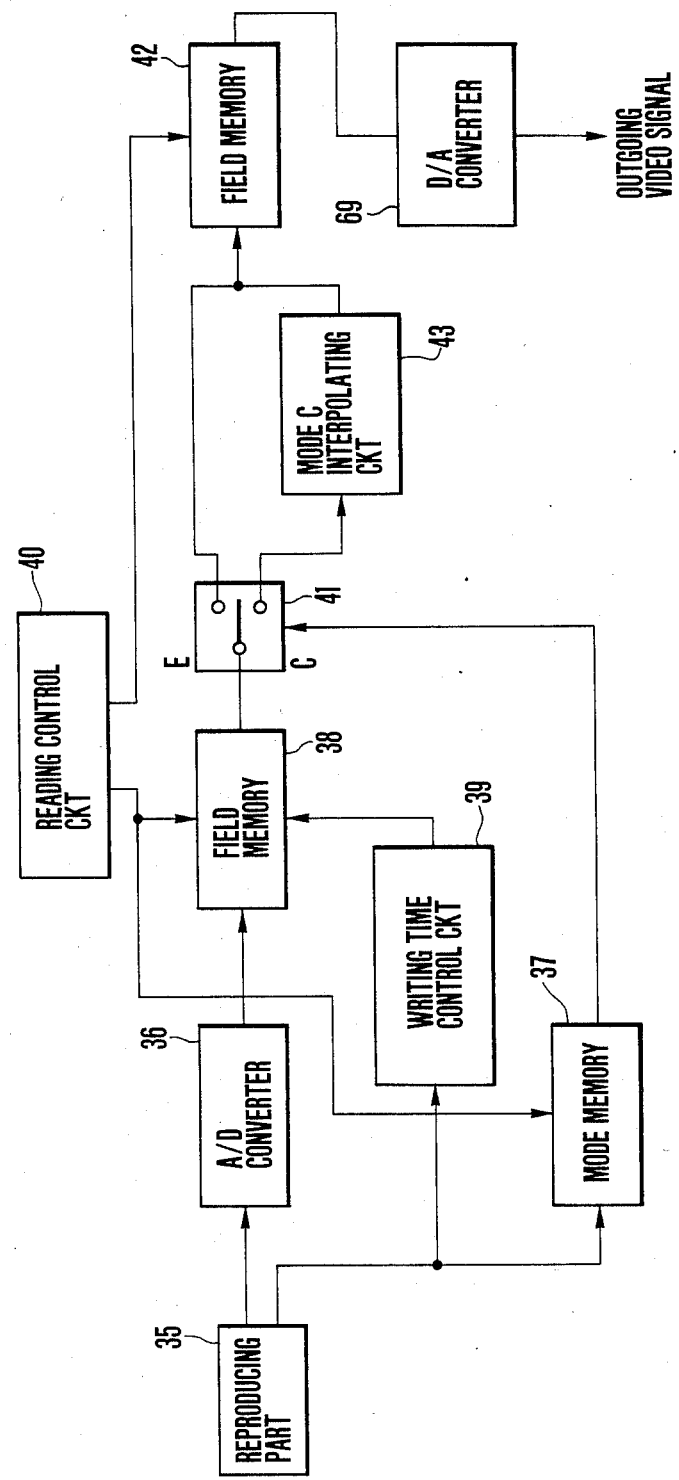
FIG. 6 shows in outline the arrangement of the reproducing system of the same embodiment.

FIG. 6 shows in outline the arrangement of the reproducing system of the VTR arranged to reproduce the information signal recorded by the recording system shown in FIG. 5. Referring to FIG. 6, the analog video signal which is compressed to have ½ of its original bandwidth and the mode information signal are reproduced by a reproducing part 35 from a tape which is not shown. The reproduced analog video signal is supplied to an A/D/ converter 36 to be converted into a digital video signal while the reproduced mode information signals are supplied to and stored at a mode memory 37. The digital video signal produced from the A/D converter 36 is supplied to a field memory 38. A process of writing into the field memory 38 is performed under the control of a writing time control circuit 39. The writing time control circuit 39 is arranged to receive also the reproduced mode information signals. When the digital video signal is detected to be of the mode E by means of the mode information signal supplied, the digital video signal is written into the field memory 38 at a normal speed. If the digital video signal is detected to be of the mode C through the mode information signal, the digital video signal is written into the field memory 38 at a speed which is ½ of the normal speed.

The digital video signal which is thus written into the field memory 38 is read out block by block by means of a reading control circuit 40 and is supplied to a switch 41.

The switch 41 is arranged to have it connecting position changed from one position over to the other according to the mode information signal which is produced from the mode memory 37 concurrently with commencement of reading from the field memory 38. The position of the switch 41 shifts to one side E in case that the mode information signal represents the mode E and to the other side C if it represents the mode C.

The digital video signal which is read out block by block from the field memory 38 is supplied to a field memory 42 if it is determined to be in the mode E by the mode information signal. In case that the video signal is in the mode C, the signal is subjected to an interpolation process which is performed at a C mode interpolation circuit 43 block by block to interpolate for the picture element information not transmitted by utilizing the picture element information which has been transmitted. After completion of the interpolation, the interpolated signal is supplied to the field memory 42.

At the field memory 42, one field portion of the digital video signal is processed and stored in a manner as mentioned in the foregoing. After that, the signal is read out from the field memory 42 by the reading control circuit 40 and is supplied to a D/A converter 43. The signal is converted into an analog video signal and is produced from the D/A converter 43 as a video signal.

The analog video signal and the mode information signal which are recorded on the tape are reproduced through the operation described above in the same form of signal as the form in which they are supplied during recording.

In the embodiment described, a number 4×4 of picture elements are grouped into each of the blocks forming one image plane. However, in accordance with this invention, this block arrangement may be changed in a suitable manner.

The VTR arranged according to this invention as described in the foregoing is capable of transmitting an information signal in a state of having it high frequency component suppressed with simple structural arrangement.

Another embodiment in which this invention is also applied to a VTR is arranged as follows: In dividing one field of a TV image plane of the NTSC system into a plurality of blocks, each block is arranged to include 4×4 picture elements in the same manner as in the case of the VTR shown in FIG. 5.

Figure 12:
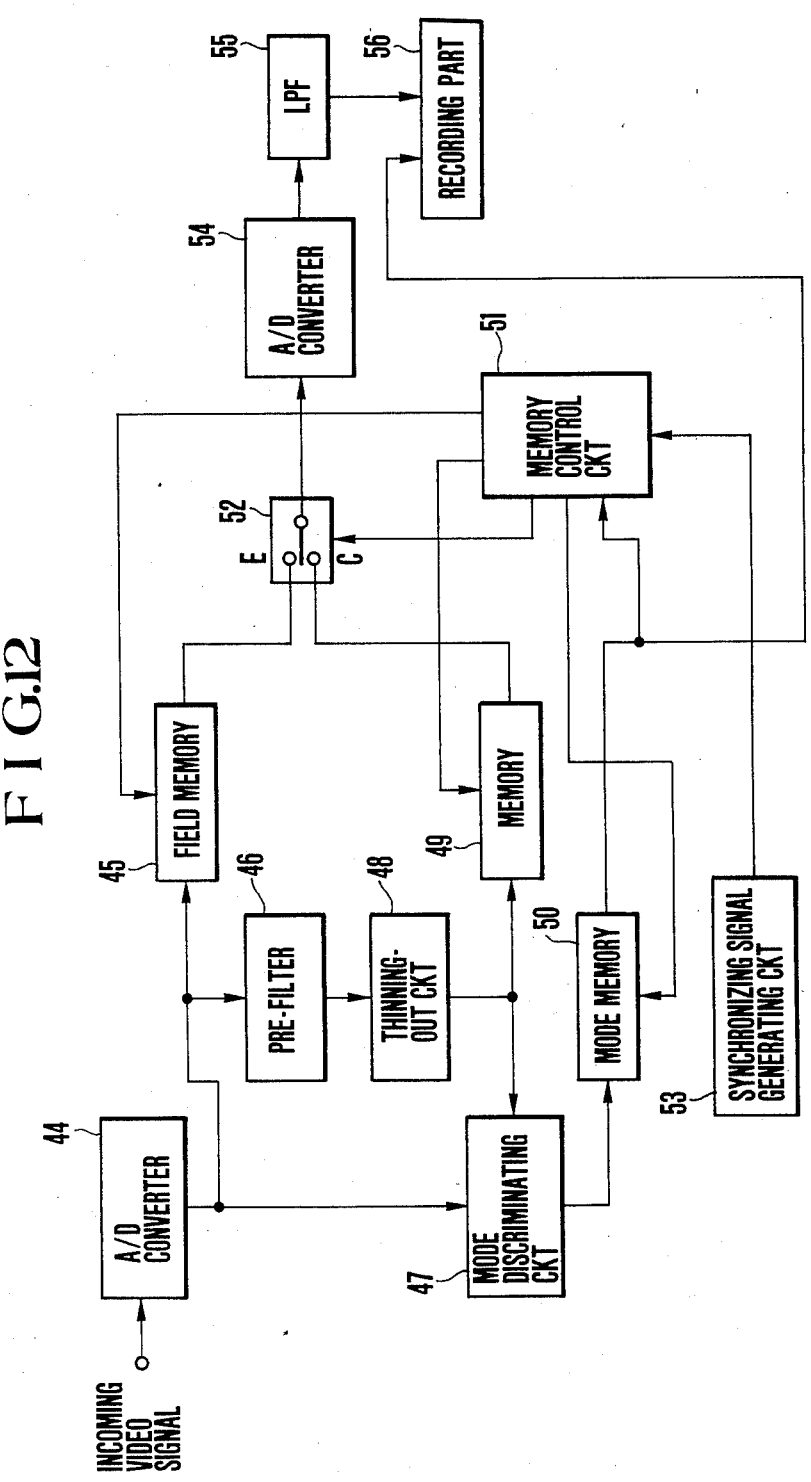
FIG. 12 is a block diagram showing an outline the arrangement of the recording system of a VTR embodying this invention as another embodiment of the invention.

FIG. 12 shows in outline the arrangement of the recording system of the VTR which is arranged as the above-stated another embodiment. One field portion of an incoming analog video signal is converted into a digital video signal by the A/D converter 44. The digital video signal is supplied to a field memory 45, a pre-filter 46 and a mode discriminating circuit 47. At the field memory 45, the digital signal is stored in a state of including all the picture elements of one field portion of the signal. In other words, a digital video signal having all the picture element blocks in the mode E is stored at the field memory 45. The pre-filter 46 is a two-dimensional low-pass filter which is arranged to remove the high frequency component of the digital video signal. The digital video signal of the mode E is averaged by this filter 46. The averaged digital video signal of the mode E is thinned out into a digital video signal of the mode C to have ¼ of the picture elements by a skipping or thinning out circuit 48 as shown in FIG. 2(b). The digital video signal of the mode C which is thus obtained from the circuit 48 is supplied to a mode discriminating circuit 47 and a memory 49. The memory 49 then stores the digital video signal of the mode C.

The mode discriminating circuit 47 is arranged to receive both the digital video signal of the mode E and that of the mode C. An interpolating process is performed on the digital video signal of the mode C. After that, the circuit 47 compares for every block an image signal obtained from the digital video signal of the mode E with an image signal obtained from the interpolated digital video signal of the mode C and temporarily stores information on an error or difference between the two. Then, the mode E is allocated at a predetermined rate to the block in case that the difference is large and the mode C is allocated to the block at a predetermined rate in the event of a small difference. The circuit 47 then generates a mode information signal according to the allocation. In other words, the mode information signals are generated to represent the mode E for a block having dense information within the one-field image plane and to represent the mode C for a block having sparse information.

In order to made unvarying the length of time required in transmitting each field portion of the video signal, the ratio between the number of blocks to be transmitted in the mode C and that of blocks to be transmitted in the mode E must be fixed.

In the case of this embodiment, with one image plane divided into a plurality of blocks, all the blocks are sampled in the mode C. After that, the blocks in a dense part of the image are further sampled in the mode E.

In this instance, if the transmitting band is to be compressed to a degree of ½ as a whole, for example, the desired rate of compression is attainable by allocating the mode E to ¼ of all the blocks to be transmitted. Further, in allocating the mode information signal to these blocks, the difference information values off all the blocks stored are arranged in the order of largeness of the value and the mode E is allocated to ¼ of the blocks having larger difference values by setting a threshold value at a suitable value for that purpose. Then, the threshold value is compared with error or difference information. The mode E is allocated to the blocks having difference values larger than the threshold value. With the modes E and C allocated in this manner for transmission, the transmitting band compressing rate becomes ½ as a whole.

The mode information signal which is thus produced at the mode discriminating circuit 47 in the manner as described above is stored at a mode memory 50.

Figure 7:
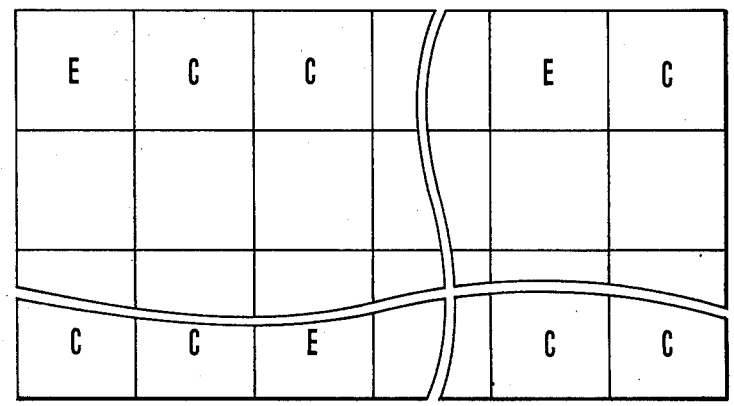
FIG. 7 is an illustration showing by way of example the allocation of mode information signals on an image plane.
Figure 8:
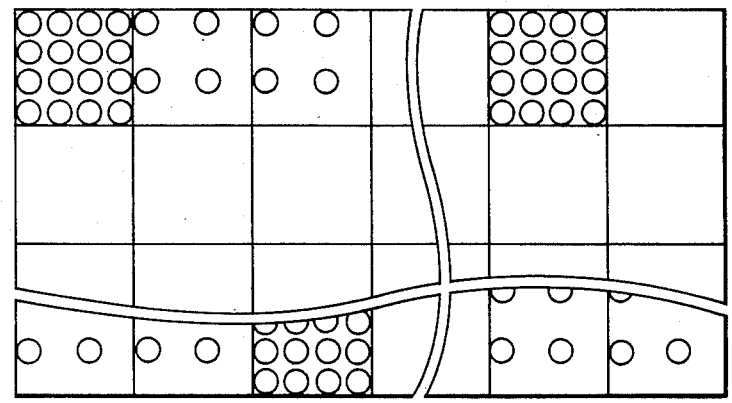
FIG. 8 shows the arrangement on the image plane of picture elements to be transmitted in accordance with the mode information signals allocated as shown in FIG. 7.

FIG. 7 shows by way of example the above-stated mode information signals as allocated to blocks on an image plane. The allocation on the image plane of the picture elements within each of the blocks to be transmitted according to the mode information signals becomes as shown in FIG. 8.

Figure 9:
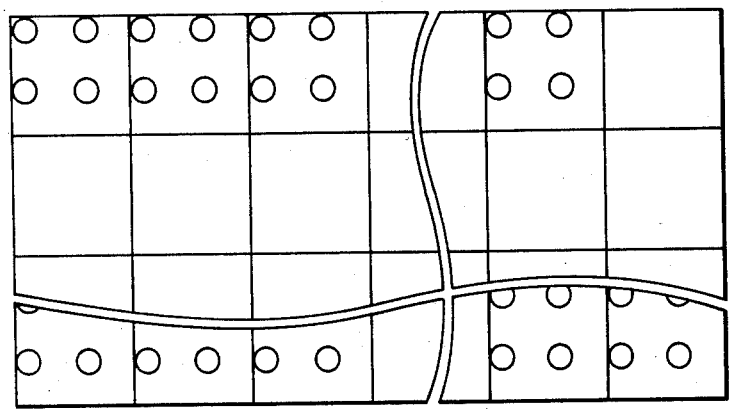
FIG. 9 shows the positions on the image plane of the picture elements to which the mode C is applied.
Figure 10:
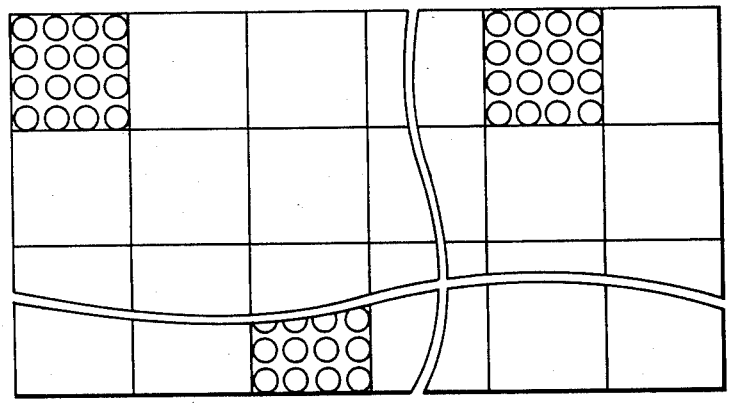
FIG. 10 shows the positions on the image plane of the picture elements to which the mode E is applied.

In actuality, however, it is the information on the picture elements of the mode C blocks which are as shown in FIG. 9 and the information on the picture elements of the mode E blocks which are as shown in FIG. 10 that is actually transmitted. These data are read out from a memory 49 and a field memory 45 by means of a memory control circuit 51 which will be described later. For example, one field portion of the mode C picture elements is transmitted during the first half of one field period while one field portion of the mode E picture elements is transmitted during the latter half of the same one-field period in a separate manner as shown in FIG. 11.

As apparent from FIGS. 9 and 10, for the groups or blocks to which the mode E is allocated have all of their picture elements transmitted. Therefore, considering each block in a one-dimensional manner, the transmitting band in the mode E is four times as much as the transmitting band of the mode C within one block. However, since the modes E and C are allocated in the ratio of 1:4 within one field image plane, the transmitting band of the first half of one field period becomes equal to that of the latter half of the same field period with the picture element information data arranged to be transmitted at a constant speed and at equal intervals.

Figure 13:
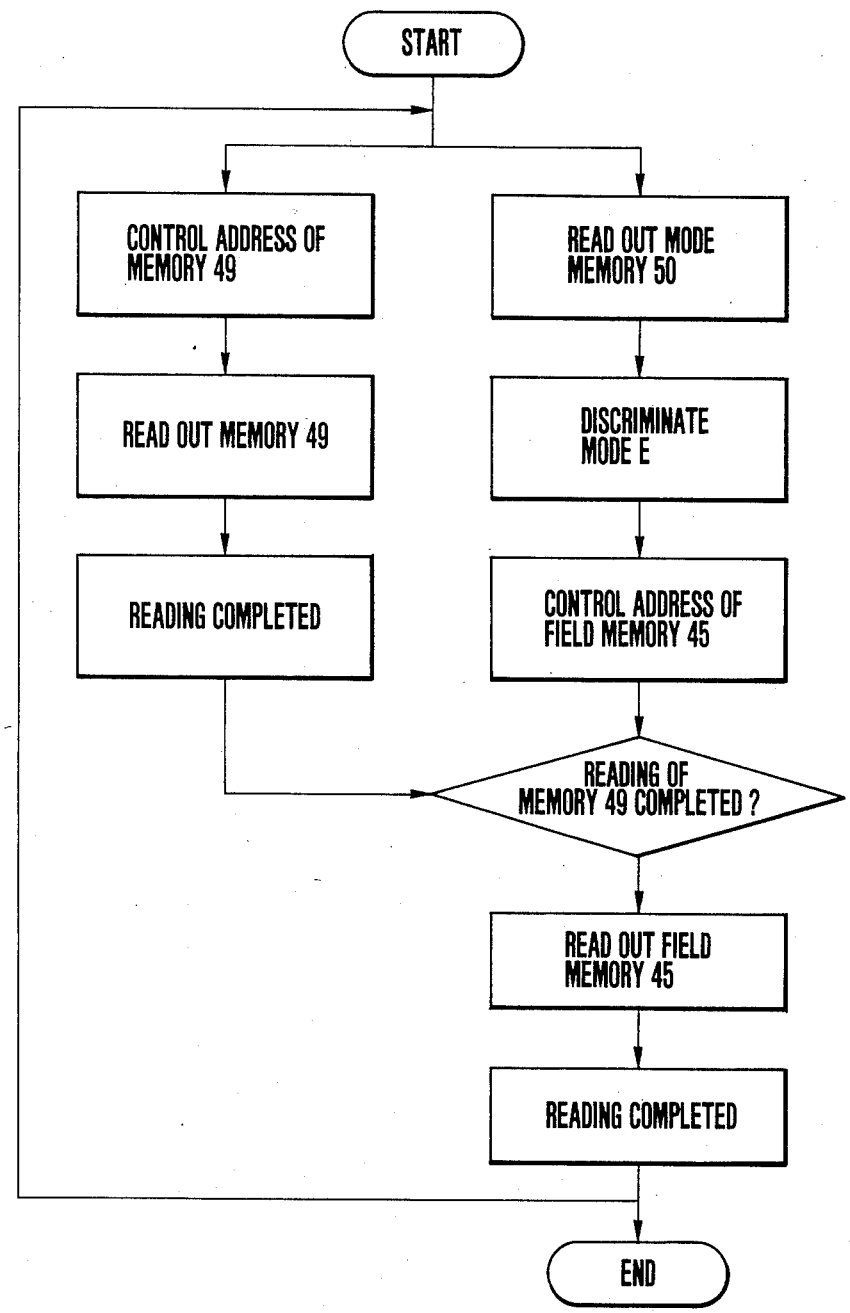
FIG. 13 is a flow chart showing the operation of a memory control circuit 51 included in the same embodiment shown in FIG. 12.

The memory control circuit 51 is arranged to operate as shown in a flow chart in FIG. 13. Referring to FIG. 13, upon completion of writing the information signals of all the picture element blocks of one field portion into the memory 49 and the field memory 45 in the manner as described above, the memory control circuit 51 begins to read out the signals from the memories. At the memory control circuit 51, reading address signals are first generated for reading from the memory 49 the information signals representing the mode C picture elements included in the blocks of one field. An address of the memory 49 is designated by using the address signal thus generated. The information signals representing the mode C picture elements are read out and supplied to a change-over switch 52. The memory control circuit 51 has been supplied with a synchronizing signal generated by a synchronizing signal generating circuit 53. The addresses are up counted in synchronism with this synchronizing signal. Then, according to these addresses, the information signals representing the mode C picture elements are read out one after another during the ½ field period at a speed which is twice as fast as the speed at which these signals have been written in. This synchronizing signal is a pulse signal of such a frequency that enables the information signals of all the mode C picture elements to be completely read out during the ½ field period. At the memory control circuit 51, the mode information signals are stored at the mode memory 50 are also read out while the information signals representing the mode C picture elements are read out from the memory 49. The mode information signals are supplied also to the memory control circuit 51. The memory control circuit 51 is provided with a mode E detector, an address counter and a counter memory for the purpose of detecting the addresses of the information signals representing the picture elements of blocks designated to be in the mode E among the information signals representing all the picture elements stored at the field memory 45. This address counter up counts the addresses in synchronism with the reading clock pulses applied to the mode memory 50. A counted value obtained at the address counter when a mode information signal representing the mode E is detected by the E mode detector is stored at the counter memory. Upon completion of reading the information signals representing the mode C picture elements from the memory 49, the information signals representing the mode E picture elements are continuously read out from the field memory 45 according to the addresses stored at the counter memory. The information signals thus read out are supplied to the change-over switch 52. The process of reading, from the field memory 45, the information signals for the mode E picture elements also comes to an end within ½ field period.

Figure 11:
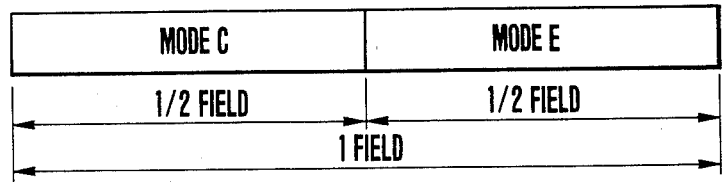
FIG. 11 shows a manner in which information signals for picture elements are transmitted in the modes E and C.

The information signals for the mode C and mode E picture elements which are thus read out from the memory 49 and the field memory 45 are supplied via the change-over switch 52 to a D/A converter 54 in a state as shown in FIG. 11. The operation of the change-over switch 52 is under the control of the memory control circuit 51. The connecting position of the change-over switch 52 is on one side C thereof while the information signals for the mode C picture elements are being read out and on the other side E thereof while the information signals for the mode E picture elements are read out.

The output of the change-over switch 52 is converted into an analog signal by the D/A converter 54. The analog signal thus obtained is supplied to a lowpass filter 55 for band limitation. After this band limiting process, the signal is recorded by a recording part 56 together with the mode information signals.

As described above, an image information signal is divided for transmission into information signals for the mode C picture elements and information signals for the mode E picture elements for all the divided blocks. By virtue of this arrangement, the information signals for the mode C picture elements can be decoded without necessitating any mode information signal during the process of decoding. In other words, in the event of occurrence of any error in the mode information signal during a transmission process, the decoding process can be accomplished by means of the information signals for the mode C picture elements.

FIG. 14 shows in outline the arrangement of the reproducing system for reproducing the information signal recorded by the recording system of the VTR shown in FIG. 12. The reproducing operation of the system is as follows: Referring to FIG. 14, a reproducing part 57 reproduces an image information signal and a mode information signal. These signals are respectively supplied to an A/D converter 58 and a mode error detecting circuit 59. The image information signal which is an analog signal is converted into a digital signal by the A/D converter 58. The digital signal is supplied to a switch 60. Meanwhile, a synchronizing signal which is reproduced by the reproducing part 57 has been supplied also to the switch 60. The switch 60 divides the recorded digital image information signal into mode C picture element information signals and mode E picture element information signals. These divided information signals are stored at a mode C memory 61 and a mode E memory 62 as applicable. The connecting position of the switch 60 is shifted from one side C to the other side E thereof at intervals of ½ field period in synchronism with the above-stated synchronizing signal.

The reproduced mode information signal on the other hand is stored at a mode memory 63. Meanwhile, the mode error detecting circuit 59 detects the number of signals representing the mode E included in all the mode information signals reproduced. The circuit 59 counts this number. The number of blocks to which the mode E is allocated within one field during recording is predetermined and fixed. Therefore, with the number of the mode E blocks counted during the reproducing operation, the circuit 59 determines that there is no error in the mode information when the count number coincides with the predetermined number and determines that the mode information is in error if the count number differs from the predetermined number.

In case that the mode information signal is determined to be in error at the mode error detecting circuit 59, an error detection signal is supplied from the mode error detecting circuit 59 to a mode conversion circuit 64. In response to this error detection signal, the mode conversion circuit 64 reads out the mode information signals stored at the mode memory 63 and converts all the mode information signals into mode information signals representing the mode C. If the mode information signal is determined to be correct at the mode error detecting circuit 59, the signals read out form the mode memory 63 is produced as they are through the mode conversion circuit 64.

The mode information signals which are thus produced from the mode conversion circuit 64 are supplied to a reading control circuit 65. The reading control circuit 65 reads out picture element information signals stored at the mode C memory 61 and the mode E memory 62 respectively according to the mode information signals received. The information of the mode C picture elements read out from the mode C memory 61 is interpolated at a mode C interpolating circuit 66 with the transmitted picture element information for the picture element information not transmitted. The interpolated picture element information is stored at a field memory 67 while the mode E picture element information is stored as it is at the field memory 67. One field portion of the image information signal is stored at the field memory 67 in this manner.

After that, the image information signal stored at the field memory 67 is read out according to a control signal produced from the reading control circuit 65. The signal thus read out is supplied to a D/A converter 68 to be converted into an analog video signal before it is produced from the reproducing system.

While this invention is applied to a VTR in the case of the embodiment described, the invention is applicable also to apparatuses of other kinds such as a video disc apparatus, various recording/reproducing apparatuses, communication apparatuses, etc.

In the embodiment described, each of the divided picture element blocks is arranged to include 4×4 picture elements. However, this block arrangement may be changed as desired. Further, in generating the data of the mode C picture elements, the whole picture element data of each block are first subjected to band limitation before thinning out the mode C picture element data. Therefore, during reproduction, even if the mode C picture elements are restored using only the mode C data with the mode information signal incorrectly reproduced due to an error or drop-out or the like, the quality of a reproduced picture can be prevented from deteriorating.

In accordance with this invention, as described in the foregoing, even in cases where only a part of picture elements within one block are transmitted during the recording and reproducing operation of the VTR, information can ba prevented from deteriorating during a decoding process. Even in the event of occurrence of an error in the mode information signal during a transmission process, at least a portion of picture element information signals are transmitted, so that the deterioration of the information thus transmitted can be minimized.

As apparent from the foregoing description of the embodiment of this invention, the VTR according to this invention is capable of minimizing deterioration of information with simple structural arrangement, so that information can be reproduced in a satisfactory state.

What is claimed is:

1. An information signal transmission system for transmitting an original image signal corresponding to an original picture consisting of m picture elements (m is an integer, m≧2) by dividing the original picture into a plurality of picture element blocks, each consisting of n adjoining picture elements (n is an integer, n<m), sampling image signals corresponding to the respective picture element blocks on the basis of one of a plurality of sampling modes which are different from each other in number of picture elements to be sampled and then transmitting the image signals, comprising:

(A) first image information signal sampling means for sampling a first image information signal corresponding to a first picture element among the n picture elements constituting each picture element block, in respect of all of said plurality of picture element blocks;

(B) first memory means for storing the first image information signals of each picture element block sampled by said first image information signal sampling means;

(C) second image information signal sampling means for sampling a second image information signal corresponding to a second picture element, which is different from said first picture element, among the n picture elements constituting each picture element block, in respect of at least a part of said plurality of picture elements;

(D) second memory means for storing the second image information signals sampled by said second image information signal sampling means;

(E) sampling mode indicating signal generating means arranged to decode which sampling mode among said plurality of sampling mode is adopted, in respect of the respect blocks of said plurality of picture element blocks, and to output a sampling mode thus decided; and (F) transmission signal forming means arranged to read out the image information signals from said first memory means or said second memory means by sequentially reading out the image information signals corresponding to the picture elements arranged in a same horizontal direction of said original picture, among the first image information signals or the second information signals stored in said first or second memory means, according to the sampling mode indicated by said sampling mode indicating signal and to form a transmission signal by using said first image information signals and said second image information signals.

2. A system according to claim 1, wherein said first memory means is arranged to receive said first image information signals sampled by said first information signal sampling means for every one of the picture element blocks and to group and store the image information signals corresponding to the picture elements arranged in the same horizontal direction in the respective picture elements blocks.

3. A system according to claim 2, wherein said second memory means is arranged to receive said second image information signal sampled by said second image information sampling means and to group and store the image information signals corresponding to the picture elements arranged in the same horizontal direction in the respective picture element blocks.

4. A system according to claim 3, wherein said transmission signal forming means is arranged to receive a horizontal synchronizing signal synchronized with a horizontal scanning time of the original image signal and a block synchronizing signal synchronized with timing where a boundary point between the respective picture element blocks appears in the horizontal scanning time, and to read out said first image signal information signal or said second image information signal from said first memory means or said second memory means at a timing synchronized with said horizontal synchronizing signal and said block synchronizing signal.

5. A system according to claim 4, wherein said original image signal is an interlacing image signal.

6. A system according to claim 5, wherein said transmission signal forming means includes:

(A) a change-over circuit arranged to change over said first image information signal or said second image information signal read out from said first memory means or said second memory means and to output said signal;

(B) a line discriminating circuit arranged to receive said horizontal synchronizing signal to discriminate whether the first image information signal or the second image information signal outputted from said change-over circuit is an odd line signal of the corresponding original picture or an even line signal of the same and to output a line discriminating signal, and (C) change-over control circuit for controlling change-over operation of said change-over circuit, depending upon the sampling mode indicating signal generated by said sampling mode indicating signal generating means and the line discriminating signal produced from said line discriminating circuit.

7. An information signal transmission system for transmitting an original image signal corresponding to an original picture consisting of m picture elements (m is an integer, m≧2) by dividing the original picture into a plurality of picture element blocks, each consisting of n adjoining picture elements (n is an integer, n<m), sampling image signals corresponding to the perspective picture element blocks on the basis of one of a plurality of sampling modes which are different from each other in number of picture elements to be sampled and then transmitting the image signals, comprising:

(A) first image information signal forming means for sampling j picture elements (j is an integer, j<n)

among the n picture elements constituting each picture elements block to form first image information signal, in respect of all of said plurality of picture element blocks;

(B) first memory means for storing the first image information signals of each picture element block formed by said first image information signal forming means so that they correspond to an arrangement of the picture element blocks in said original picture;

(C) second image signal forming means for sampling k picture elements (k is an integer, k≦n) among the n picture elements constituting each picture element block to form second image information signals, in respect of at least a part of said plurality of picture elements;

(D) second memory means for storing the second image information signals of the respective picture element blocks formed by said second image information signal forming means so that they correspond to the arrangement of the picture element blocks in said original picture;

(E) sampling mode indicating signal generating means arranged to decide which sampling mode among said plurality of sampling mode is adopted, in respect of the respective blocks of said plurality of picture element blocks, and to output a sampling mode indicating signal which indicates a kind of the sampling mode thus decided;

(F) read-out control means arranged to read out said first image information signal or said second image information signal in an order corresponding to an order of scanning when the picture elements of said original picture are subjected to rasater scanning from said first memory means or said second memory means, depending upon the sampling mode indicating signal generated by said sampling mode indicating signal generating means; and (G) change-over output means for effecting change-over of said first image information signal or said second image information signal read out from said first memory means or said second memory means.

8. A system according to claim 7, wherein said first memory means includes a memory for storing said first image information signal.

9. A system according to claim 8, wherein said second memory means includes a memory for storing said second image information signal.

10. A system according to claim 9, wherein said information transmission system comprises an address signal generating means which is arranged to receive a horizontal synchronizing signal synchronized with a horizontal scanning time of said original image signal and a block synchronizing signal synchronized with a timing when a boundary point between the respective picture elements appears in the horizontal scanning time of said original image signal, and to indicate an address of the first information signal or the second image information signal stored in said first memory means or said second memory means.

11. A system according to claim 10, wherein said information signal transmission system comprises write control means arranged to receive the address signal generated by said address signal generating means, assign a writing address of said first image information signal or said second image information signal to the respective memories of said first memory means or said second memory means by said address signal and write said first image information signal or said second image information signal into the respective memories.

12. A system according to claim 11, wherein the sampling modes include a first sampling mode for sampling j picture elements among n picture elements constituting said picture element block and a second sampling mode for sampling k picture elements among n picture elements constituting said picture element block, and said sampling mode indicating signal generating means is arranged to assign said second sampling mode only to a part of said plurality of picture element blocks and to output a first sampling mode indicating signal representing the first sampling mode and a second sampling mode indicating signal representing the second sampling mode.

13. A system according to claim 12, wherein said information signal transmission system comprises block address signal memory means arranged to receive the sampling mode indicating signal produced by said sampling mode indicating signal generating means, said block synchronizing signal and the address signal generated by said address signal generating means, and to form and store a block address signal of the picture element blocks to which the second sampling mode is assigned by said sampling mode indicating signal generating means.

14. A system according to claim 13, wherein said address signal memory means includes:

(A) a counter arranged to receive a sampling mode indicating signal produced by said sampling mode indicating signal generating means and said block synchronizing signal, count pulses of the block synchronizing signal, which said counter received, every time when it received the second sampling mode indicating signal and produce an output of counted value as a block address signal of the picture element block; and (B) a memory for storing the block address signal of the picture element block outputted from said counter.

15. A system according to claim 13, wherein said information signal transmission system comprises line discriminating means arranged to receive said horizontal synchronizing signal, discriminate whether the first image information signal or the second image information signal outputted from said change-over output means is an odd line signal or an even line signal of the corresponding original picture and produce a line discriminating signal.

16. A system according to claim 15, wherein said read-out control means is arranged to effect read-out operation to read out the first image information signal at a same speed as that of writing speed from said first memory means in the case where the first sampling mode indicating signal is outputted from said sampling mode indicating signal generating means while the image information signal read out from said first memory means or said second memory means is being discriminated as the odd line signal of said original picture by means of said line discriminating means and at a speed slower than the writing speed from said second memory means in the case where the second sampling mode indicating signal is outputted.

17. A system according to claim 16, wherein said read-out control means is arranged to form a read-out address signal by using the block address signal stored in said block address signal memory means and the address signal outputted from said address signal generating means when the image information signal read out from said first memory means or said second memory means is being discriminated as the even line signal of said original picture by means of said line discriminating means and to effect the read-out operation of the second image information signal at a speed slower than writing speed from said second memory means by said read-out address signal.

18. A system according to claim 15, wherein said change-over output means is arranged to receive the line discriminating signal outputted from said line discriminating means and the sampling mode indicating signal outputted from said sampling mode indicating signal generating means and to output the first image information signal or the second image information signal, depending upon the received signal.

19. A system according to claim 15, wherein said change-over output means is arranged to output the first image information signal read out from said first memory means in the case where the first sampling mode indicating signal is outputted when the image information signal read out from said first memory means or said second memory means is being discriminated as the odd line signal of said original picture by means of said line discriminating means and to the second image information signal read out from said second memory means in the case where said second sampling mode indicating signal is outputted and to output the second image information signal read out from said second memory means in the case where said second sampling mode indicating signal is outputted, and it is further arranged to output the second image information signal read out from said second memory means when the image information signal read out from said first memory means or said second memory means is being discriminated as the even line signal of said original picture by means of said line discriminating means.

20. An information signal transmission system for transmitting an original image signal corresponding to an original picture consisting of m picture elements (m is an integer, m≧2) by dividing the original picture into a plurality of picture elements blocks, each consisting of n adjoining picture elements (n is an integer, n<m), sampling image signals corresponding to the respective picture element blocks on the basis of one of a plurality of sampling modes which are different from each other in number of picture elements to be sampled sand then transmitting the image signal, comprising:
  (A) suppressing means for suppressing high frequency component of the image signals of said plurality of picture element;
  (B) first image information signal sampling means for sampling the first image information signals corresponding to the first picture element among n picture elements constituting the respective picture element blocks, in respect of all of the plurality of picture element blocks in which the high frequency component of the image signal is suppressed by said suppressing means;
  (C) first memory means for storing the first image information signals of the respective picture elements sampled by said first image information signal sampling means;
  (D) second image information signal sampling means for sampling the second image information signals corresponding to the second picture element, different from said first picture element, among the n picture elements constituting the respective picture element blocks, in respect of at least a part of said plurality of picture elements;
  (E) second memory means for storing the second image information signals sampled by said second image information signal sampling means;
  (F) sampling mode indicating signal generating means arranged to decide the sampling mode, which is to be adopted, among said plurality of sampling modes, in respect of the respective ones of said plurality of picture element blocks;
  (G) read-out means for reading out the image information signal from said first memory means or said second memory means in which the image information signals, which correspond to the picture elements arranged in a same horizontal direction of said original picture, among the first image information signals or the second image information signals stored in said first memory means or said second memory means are sequentially read out in the sampling mode indicated by said sampling mode indicating signal; and
  (H) transmission means for transmitting the first image information signal read out from said first memory means and said second image information signal read out from said second memory means, by said read-out means, and the sampling mode indicating signal outputted from said sampling mode indicating signal generating means.

21. A system according to claim 20, wherein said first memory means is arranged to receive said first image information signals sampled by said first information signal sampling means for every one of the picture element blocks and to group and store the image information signals corresponding to the picture elements arranged in the same horizontal direction in the respective picture element blocks.

22. A system according to claim 21, wherein said second memory means is arranged to receive said second image information signal sampled by said second image information sampling means and to group and store the image information signals corresponding to the picture elements arranged in the same horizontal direction in the respective picture element blocks.

23. A system according to claim 22, wherein said information transmission system comprises a synchronizing signal generating means which is arranged to generate a horizontal synchronizing signal synchronized with a horizontal scanning time of said original image signal and a block synchronizing signal synchronized with a timing when a boundary point between the respective picture elements appears in the horizontal scanning time of said original image signal.

24. A system according to claim 23, wherein said read-out means is arranged to read out the first image information signal stored in said first memory means and the second image information signal stored in said second memory means, in synchronized relation to the horizontal synchronizing signal outputted from said synchronizing signal generating means.

25. A system according to claim 24, wherein said first image information signal sampling means is arranged to sample the first image information signals corresponding to n/4 picture elements among n picture elements constituting the respective picture element blocks, in respect of all of the picture element blocks in which the high frequency components of the image signals are suppressed by said suppressing means.

26. A system according to claim 25, wherein said second image information signal sampling means is arranged to sample the second image information signals corresponding to all of the n picture elements, in respect of all of said plurality of picture elements.

27. A system according to claim 26, wherein the sampling modes include a first sampling mode for sampling n/4 picture elements among n picture elements constituting said picture element block and a second sampling mode for sampling all of the picture elements and said sampling mode indicating signal generating means is arranged to assign said second sampling mode only to a part of said plurality of picture element blocks and to output a first sampling mode indicating signal representing the first sampling mode and a second sampling mode indicating signal representing the second sampling mode.

28. A system according to claim 27, wherein said sampling mode indicating signal generating means is arranged to assign said first sampling mode to ¾ of all picture element blocks corresponding to said original picture and assign said second sampling mode to ¼ of all picture elements.

29. A system according to claim 28, wherein said transmission means includes change-over output means for effecting change-over of the first image information signals outputted from said first memory means and the second image information signals outputted from said second memory means at every periods corresponding to ½ of output period of the image information signal of one field.

30. An information signal transmission system for transmitting an original image signal corresponding to an original picture consisting of m picture elements (m is an integer, m≧2) by dividing the original picture element blocks, each consisting of n adjoining picture elements (n is an integer, n<m), sampling image signals corresponding to the respective picture element blocks on the basis of one of a plurality of sampling modes which are different from each other in number of picture elements to be sampled and then transmitting the image signals, comprising:

(A) suppressing means for suppressing high frequency component of the image signals corresponding to said plurality of picture elements;

(B) first image information signal sampling means for sampling the first image information signals corresponding to the first picture element among n picture elements constituting the respective picture element blocks, in respect of all of the plurality of picture element blocks in which the high frequency component of the image signal is suppressed by said suppressing means;

(C) first memory means for storing the first image information signals of the respective picture elements sampled by said first image information signal sampling means;

(D) second image information signal sampling means for sampling the second image information signals corresponding to the second picture element, different from said first picture element, among the n picture elements constituting the respective picture element blocks, in respect of at least a part of said plurality of picture elements;

(E) second memory means for storing the second image information signals sampled by said second image information signal sampling means;

(F) sampling mode indicating signal generating means arranged to decide the sampling mode, which is to be adopted, among said plurality of sampling modes, in respect of the respective ones of said plurality of picture element blocks;

(G) read-out means for reading out the image information signals from said first memory means or said second memory means in which the image information signals, which correspond to the picture elements arranged in a same horizontal direction of said original picture, among the first image information signals or the second image information signals stored in said first memory means or said second memory means are sequentially read out in the sampling mode indicated by said sampling mode indicating signal;

(H) transmission means for transmitting the first image information signal read out from said first memory means and said second image information signal read out from said second memory means, by said read-out means, and the sampling mode indicating signal outputted from said sampling mode indicating signal generating means;

(I) error detecting means for detecting an error in the sampling mode indicating signal transmitted from said transmission means; and (J) restoring means for restoring the image signal of the original picture, in the case where an error in the sampling mode indicating signal transmitted by said transmission means is detected by said sampling mode indicating signal error detecting means, by using the first image information signal only, which respect to the first image information signal and the second image information signal which are transmitted in the sampling mode where the error was detected the second image information signal, by using the first image information.

31. A system according to claim 30, wherein said information signal transmission system comprises third memory means for storing the sampling mode indicating signal outputted from said sampling mode indicating signal generating means.

32. A system according to claim 31, wherein said read-out means is arranged to effect the read-out operation, by using the sampling mode indicating signal stored in said third memory means in the case where the second image information signal is to be read out from said second memory means.

33. A system according to claim 30, wherein the sampling modes include a first sampling mode for sampling j picture elements among n picture elements constituting said picture element block and a second sampling mode for sampling k picture elements among n picture elements constituting said picture element block, and said sampling mode indicating signal generating means is arranged to assign said second sampling mode only to a part of said plurality of picture element blocks and to output a first sampling mode indicating signal representing the first sampling mode and a second sampling mode indicating signal representing the second sampling mode.

34. A system according to claim 33, wherein said error detecting means includes sampling mode indicating signal memory means for storing the sampling mode indicating signal transmitted by said transmission, and error deciding means in which the second sampling mode indicating signals in the sampling mode indicating signals transmitted by said transmission means are detected, to count a number of the picture blocks to which the second sampling mode is assigned and existence of error in the transmitted sampling mode indicating signal is decided when a predetermined number of counts has not been detected.

35. A system according to claim 34, wherein said restoring means includes sampling mode changing means arranged to change all of the sampling mode indicating signals stored in said sampling mode indicating signal storing means to the first sampling mode indicating signals if the existence of the error was detected by said error deciding means.

* * * * *